United States Patent [19]

Noeske

[11] 4,159,498

[45] Jun. 26, 1979

[54] ELECTRIC CIRCUIT BREAKER WITH HIGH CURRENT INTERRUPTION CAPABILITY

[75] Inventor: Heinz O. Noeske, Cherry Hill, N.J.

[73] Assignee: General Electric Company, Schenectady, N.Y.

[21] Appl. No.: 852,213

[22] Filed: Nov. 17, 1977

[51] Int. Cl.$^2$ ........................ H02H 7/22; H01N 33/66

[52] U.S. Cl. .................................... 361/3; 200/144 B; 200/148 R; 361/5; 361/14

[58] Field of Search .................... 361/3, 5, 2, 6, 7, 14, 361/115, 58; 200/145, 144 B, 148 R; 307/134, 135, 141.8

[56] References Cited

U.S. PATENT DOCUMENTS

| | | | |
|---|---|---|---|
| 3,244,842 | 4/1966 | Kameyama et al. | 200/145 X |
| 3,641,359 | 2/1972 | McCarty | 361/2 |
| 3,678,335 | 7/1972 | Pucher | 361/6 |
| 3,751,678 | 8/1973 | Kawasaki et al. | 361/5 |
| 3,982,088 | 9/1976 | Porter | 200/145 X |
| 4,087,664 | 5/1978 | Weston | 200/145 |

*Primary Examiner*—Patrick R. Salce
*Attorney, Agent, or Firm*—Nathan D. Herkamp; Joseph T. Cohen; Leo I. MaLossi

[57] ABSTRACT

Current interruption capability for short-line or terminal faults is achieved by connecting a fluid blast interrupter in series with a high current vacuum interrupter capable of withstanding the initial recovery voltage during such fault. The fluid blast breaker ultimately becomes able to carry the total recovery voltage by delaying opening of the vacuum interrupter for a fixed interval after opening of the fluid blast breaker has been triggered.

8 Claims, 4 Drawing Figures

ELECTRIC CIRCUIT BREAKER WITH HIGH CURRENT INTERRUPTION CAPABILITY

INTRODUCTION

This invention relates to an electric circuit breaker comprised of a plurality of circuit interrupters that are electrically connected in series and are opened sequentially during a circuit interrupting operation, and more particularly to a circuit breaker of this type in which at least one of the interrupters is a vacuum-type circuit interrupter and the remaining interrupter or interrupters are of the fluid blast type.

In J. W. Porter U.S. Pat. No. 3,982,088, issued Sept. 21, 1976 and assigned to the instant assignee, a high-voltage circuit breaker comprising a vacuum-type circuit interrupter and at least one fluid-blast type circuit interrupter is described and claimed. The interrupters of the Porter patent are electrically connected in series and arranged to be opened substantially simultaneously, so that concurrent arcing occurs in the two interrupters until about the time a natural current zero is reached. The vacuum interrupter conventionally exhibits an extremely high rate of dielectric recovery during the initial period after arcing and is therefore especially effective in withstanding the usual recovery voltage transient that builds up during this initial period. The fluid blast interrupter conventionally exhibits a much slower rate of dielectric recovery during this initial period, but if it is enabled to endure this initial period without breakdown it can thereafter withstand much higher peak recovery voltages than the vacuum interrupter. Porter therefore relies upon the vacuum interrupter to withstand the recovery voltage during the initial period after arcing, and on the fluid blast interrupter to withstand the recovery voltage after this initial period. Immediately after the circuit of Porter has been interrupted by the cooperating action of the two interrupters in the manner described above, the vacuum interrupter is reclosed while the fluid blast interrupter remains open, thus relieving the vacuum interrupter of having a continuing voltage appear thereacross.

A conventional fluid blast circuit interrupter is a slow-acting interrupter. The necessity of accelerating a large mass when the breaker starts to open severely limits displacement of the moving electrode and compression of the arc quenching gas in the puffer during the initial interval of time. Consequently, the fluid blast interrupter cannot interrupt large currents under short-line or terminal fault recovery voltage conditions until enough time has elapsed for the electrode gap to enlarge sufficiently to withstand the dielectric recovery voltage. As pointed out by R. G. Colclaser, Jr. et al., "The Effect of Capacitors on the Short-Line Fault Component of Transient Recovery Voltage", Paper No. 70 CP 176-PWR, recommended for presentation at the IEEE Winter Power Meeting, New York, N.Y., January 25–30, 1970, the transient recovery voltage produced across the contacts of a circuit interrupter while it is opening is determined by the lumped and distributed parameters coupled to the interrupter. The most severe recovery voltage conditions result from faults occurring close to the interrupter; i.e., short-line faults and terminal faults. Thus, if a fluid blast interrupter opens and an early current zero occurs, the interrupter will not interrupt short-line current, but instead will fail thermally by reigniting at a low reignition voltage. This thermal failure is desirable because the gap, being relatively small at this time, would otherwise hold off the recovery voltage transient only long enough for the transient to reach a level sufficiently high to cause a late reignition of the arc, thereby disrupting line conditions. Thermal failure on the first current zero, however, allows interruption to occur upon occurrence of a later current zero, such as the second or third.

Now assume that the fluid blast interrupter is connected in series with a vacuum interrupter, that both breakers are actuated to open simultaneously upon occurrence of a short-line or terminal fault, and that a current zero occurs at a time when the fluid blast interrupter would normally reignite with a low reignition voltage. Although the vacuum interrupter, being faster acting than the fluid blast interrupter, has already cleared by the time current zero occurs, it reignites when its recovery voltage is reached. As pointed out in the aforementioned Porter patent, this reignition of the vacuum interrupter causes the interrupter alternately to spark over and recover, at high frequency. Moreover, the interval between current zero and vacuum interrupter reignition is normally too short for the fluid blast interrupter to change state, and thus the fluid blast interrupter is likely to reignite in this interval; however, smooth thermal reignition of the fluid blast interrupter is unlikely because the vacuum interrupter voltage is highly unsteady at this time, so that undesired transient voltages may be introduced onto the protected line. Alternatively, if the current zero occurs at a time when the fluid blast interrupter is gaining recovery strength rapidly, the fluid blast interrupter will fail thermally (even if the vacuum interrupter should be short-circuited) because the arc-quenching effect of the fluid flow has not yet been fully developed. The vacuum interrupter also opens, giving the fluid blast breaker a certain amount of time to recover; nevertheless, when the vacuum interrupter subsequently breaks down, even though the fluid blast interrupter may have recovered thermally, the still small electrode gap of the fluid blast interrupter may break down dielectrically at a voltage considerably higher than the vacuum interrupter breakdown voltage. This is undesirable since the circuit is thus susceptible to application of high voltage transients following momentary circuit interruption.

I have found that the aforementioned problems associated with both short-line and terminal faults on lines protected by series-connected vacuum interrupters and fluid blast interrupters can be avoided by introducing a delay in opening of the vacuum interrupter until the fluid blast interrupter has opened to a position where it can carry the total recovery voltage. Accordingly, one object of the invention is to provide a circuit breaker employing a series-connected vacuum interrupter and fluid blast interrupter in which opening of the vacuum interrupter upon occurrence of a short-line or terminal fault is delayed for a predetermined time.

Another object is to provide a circuit breaker employing a series-connected vacuum interrupter and fluid blast interrupter in which the vacuum interrupter opens only upon occurrence of short-line or terminal faults.

Another object is to provide a circuit breaker employing a series-connected vacuum interrupter and fluid blast interrupter in which the fluid blast interrupter reignites smoothly at low reignition voltage after occurrence of a short-line or terminal fault.

Briefly, in accordance with a preferred embodiment of the invention, a high voltage circuit breaker comprises a vacuum circuit interrupter and a fluid blast circuit interrupter connected in series. Actuation of the vacuum interrupter is delayed for a predetermined interval following actuation of the fluid blast interrupter upon occurrence of a line or terminal fault. The delay is of sufficient duration to allow the fluid blast interrupter to reach a condition enabling it to carry the entire recovery voltage. Only if the fault is other than a short-line fault, or terminal fault, does the vacuum interrupter remain closed. After the vacuum interrupter has opened, it is not reclosed until after a predetermined time has elapsed, so that it does not apply a voltage across the fluid blast interrupter at the time when the fluid blast interrupter is reclosed. Thus for short-line or terminal faults, the vacuum interrupter withstands the recovery voltage during the initial period after arcing therein and the fluid blast interrupter withstands the recovery voltage after this initial period.

BRIEF DESCRIPTION OF THE DRAWINGS

The features of the invention believed to be novel are set forth with particularity in the appended claims. The invention itself, however, both as to objects and advantages thereof, may best be understood by reference to the following description taken in conjunction with the accompanying drawings in which:

DESCRIPTION OF TYPICAL EMBODIMENTS

Figure 1:
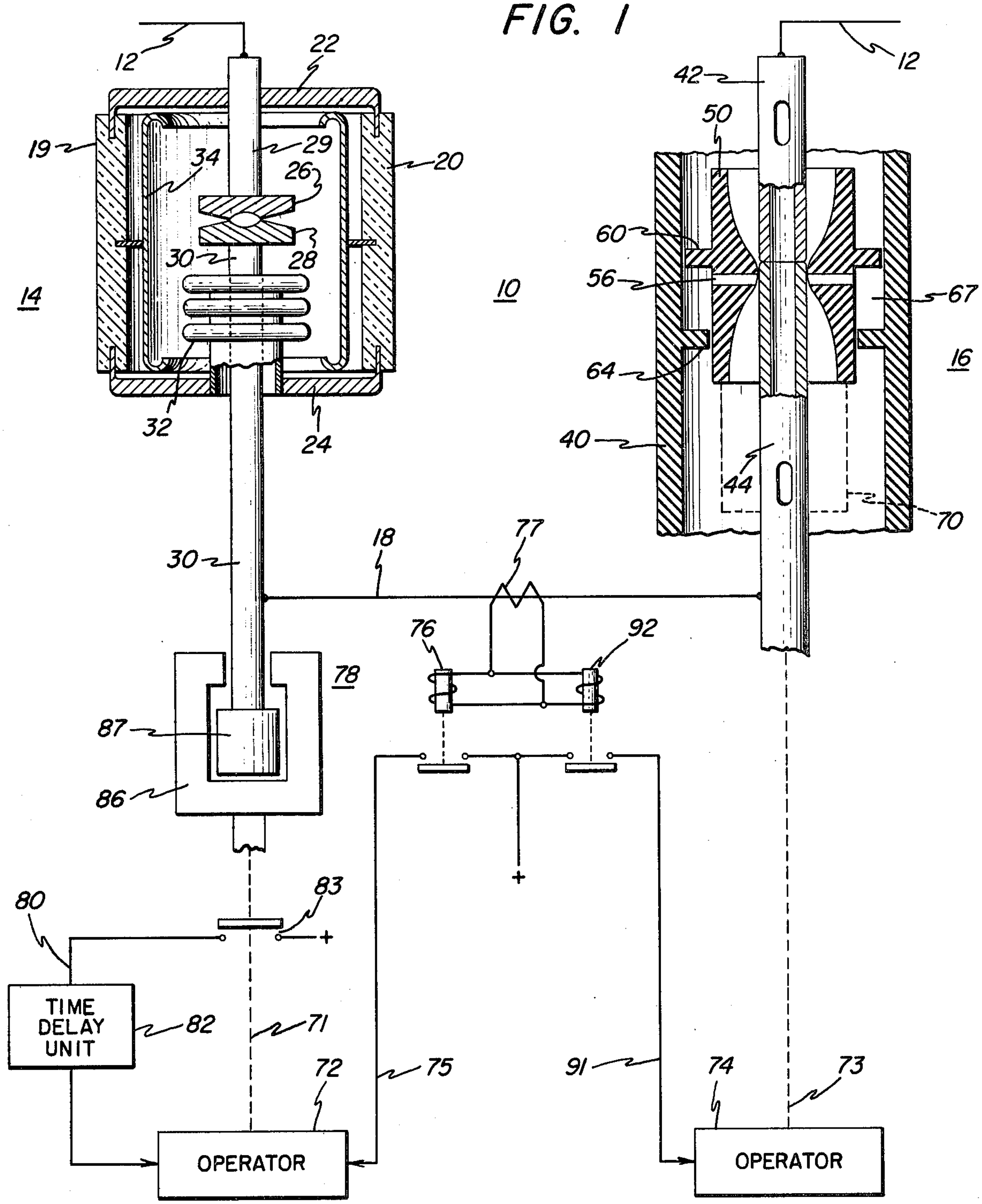
FIG. 1 is a schematic diagram of one embodiment of a circuit breaker employing the instant invention.

FIG. 1 illustrates a high voltage circuit breaker 10 connected in a high voltage A.C. power circuit 12. The circuit breaker comprises two circuit-interrupting devices 14 and 16 electrically connected in series in the power circuit through a conductor 18 extending between the interrupters. Interrupter 14 is a vacuum interrupter, and interrupter 16 is a fluid blast interrupter, each interrupter being of a generally conventional design.

Vacuum interrupter 14 comprises a highly-evacuated envelope 19 encompassing a tubular casing 20 of insulating material and a pair of metal end caps 22 and 24 hermetically sealed to the ends of the casing. Within evacuated housing 19 is a pair of separable contacts 26 and 28. Contact 26 is a stationary contact joined to the lower end of a conductive contact rod 29 projecting through the top end cap 22 in hermetically sealed relationship. Contact 28 is a movable contact joined to the upper end of movable conductive contact rod 30 projecting freely through lower end cap 24 of interrupter 14. A flexible metal bellows 32 maintains a hermetic seal about contact rod 30 and permits longitudinal movement of rod 30 without impairing the vacuum inside housing 19.

Opening of interrupter 14 is effected by driving rod 30 downward to separate movable contact 28 from stationary contact 26. This develops an arc between the contacts which persists until the next natural current zero, after which the arc is usually prevented from reigniting by the high dielectric strength of the vacuum. A tubular shield 34 surrounds the contacts in spaced relationship thereto to condense the metal vapors generated by the arc, thereby aiding the interrupter in recovering its dielectric strength after arcing. A more detailed description of such interrupter is found in Sofianek U.S. Pat. No. 3,462,572, issued Aug. 19, 1969, and assigned to the instant assignee.

Interrupter 16 is a fluid blast interrupter of the puffer type, such as shown, for example, in Noeske U.S. Pat. No. 3,739,125, issued June 12, 1973 and assigned to the instant assignee. Interrupter 16 comprises an insulating housing 40 filled with a suitable arc-extinguishing gas at a moderate pressure, e.g., sulfur hexafluoride at a pressure of about 50 p.s.i. Interrupter 16 further comprises a stationary rod contact 42 and a movable rod contact 44, shown engaged in their closed position. Surrounding rod contacts 42 and 44 is a nozzle 50 of electrical insulating material having a restricted throat intermediate its ends. Extending radially through the walls of nozzle 50 into the throat are a plurality of injection passages 56 through which arc-extinguishing gas can be injected into the throat region of the nozzle. The outer periphery of nozzle 50 carries a piston 60 that is slideable within cylindrical housing 40. An end wall 64 extends radially-inward from housing 40 and receives the sliding outer periphery of nozzle 50. A cylinder space 67 is present between piston 60 and end wall 64. When nozzle 50 moves downwardly from the position illustrated in FIG. 1, the arc-extinguishing gas present in space 67 is compressed and forced into the throat of nozzle 50 through injection passages 56.

Nozzle 50 is moved in a downward direction during opening by force transmitted from movable contact rod 44 to nozzle 50 through a linkage 70 indicated schematically. A suitable linkage for this purpose is disclosed in detail in the aforementioned Noeske U.S. Pat. No. 3,739,125. When movable contact rod 44 is driven downwardly to open interrupter 16, it separates from stationary contact rod 42, thereby drawing an arc between the contact rods that extends through the throat of nozzle 50. When movable contact rod 44 has moved downwardly beneath the mouth of injection passages 56, compressed arc-extinguishing gas is driven radially-inward through passages 56 to extinguish the arc, all as explained in greater detail in the aforementioned Noeske U.S. patent.

Figure 2:
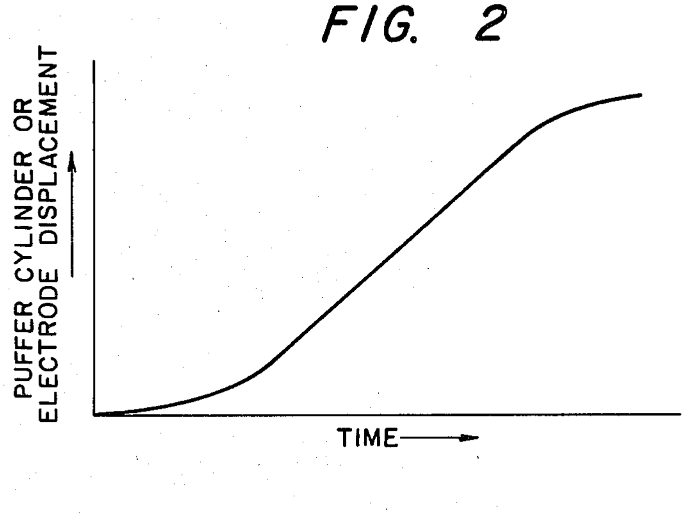
FIG. 2 is a graphical illustration of the puffer or electrode travel of a fluid blast circuit breaker with respect to time.

The curve of FIG. 2 is a plot of puffer cylinder or fluid blast interrupter electrode displacement, with respect to time. Due to the heavy mass to be accelerated when the fluid blast interrupter starts to open, travel of the moving electrode and also the puffer cylinder motion, both of which usually travel together, have the characteristic dependence with respect to time illustrated in FIG. 2.

Figure 3:
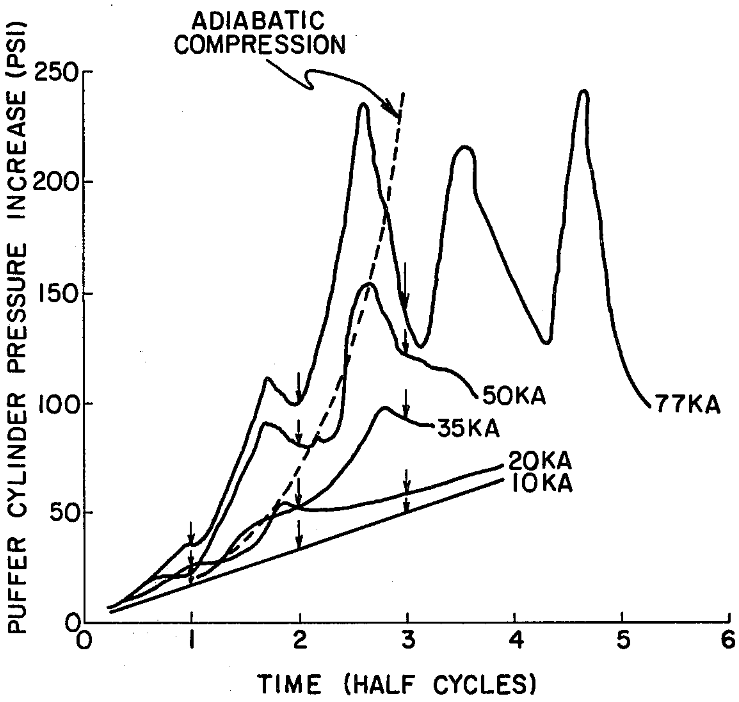
FIG. 3 is a graphical illustration of dynamic puffer pressure for various arc currents in a fluid blast interrupter.

In FIG. 3, a series of dynamic puffer cylinder pressures as a function of time is plotted for interrupted currents of various r.m.s. amplitudes, the current interruption rating of a typical fluid blast interrupter being from 45 to 50 kiloamps (r.m.s.). For each current, the vertical arrows shown in FIG. 3 indicate the times when the current is zero, i.e., when the fluid blast interrupter has a chance to clear. Consequently, pressure in puffer cylinder 67 builds up slowly at the beginning of the fluid blast interrupter opening. As a result, the fluid blast interrupter cannot interrupt higher currents with short-line or terminal fault recovery voltages until a sufficiently high pressure has been created by compression in puffer cylinder 67, obstruction of the arc-extinguishing fluid through the throat of nozzle 50 has stopped (i.e., electrode 44 has moved out of the throat), and the electrode gap is sufficiently large to withstand the dielectric recovery.

Circuit interruption is effected initially by opening fluid blast breaker 16. In the embodiment illustrated in FIG. 1, this is done by operator 74. When operators 72 and 74 receive an opening command through input channels 75 and 91, respectively, each responds by immediately driving an actuator mechanism 71 and 73 respectively associated therewith, downwardly through an opening stroke. Actuating mechanism 71, however, includes a lost motion linkage 78 comprising a driver 86 affixed to actuator mechanism 71, and a follower 87 affixed to contact rod 30. Thus when operator 72 receives an opening command through input channel 75, a fixed delay is introduced between initiation of movement of actuator mechanism 71 and initiation of movement of contact rod 30. This delay corresponds to the time required for driver 86 to be moved to a position whereby it contacts follower 87 and begins to move the follower in accordance with the movement of actuator mechanism 71.

In the schematically-illustrated embodiment of FIG. 1, the circuit breaker opening command is developed in response to operation of overcurrent relays 76 and 92 inductively coupled in parallel, to conductor 18 through a current transformer 77. When an overcurrent flows through the circuit breaker, relay 92 is energized, delivering an opening command to operator 74, which responds by opening interrupter 16 initially. Relay 76 requires a large overcurrent amplitude, which results only from a short-line or terminal fault, in order to become energized. Therefore, at overcurrent amplitudes resulting from other than a short-line or terminal fault, vacuum interrupter 14 remains unactuated. When relay 76 is energized, an opening command is delivered through input channel 75 to operator 72 which responds by opening interrupter 14.

When circuit breaker 10 is first opened, arcing occurs in fluid blast interrupter 16 until about the time a current zero occurs naturally in the alternating current in power circuit 12. Immediately thereafter, the usual recovery voltage transient begins to build up across the fluid blast interrupter. As indicated, supra, vacuum interrupter 14 exhibits an extremely high rate of dielectric recovery during the initial period after arcing therein and, with only a very small gap between its contacts, it can usually withstand the recovery voltage that appears across the interrupters during this initial period. The fluid blast interrupter exhibits a slower rate of dielectric recovery during this initial period, but if it endures the initial period without breakdown, it can thereafter withstand much higher peak recovery voltages than the vacuum interrupter.

The voltage appearing across the two interrupters initially is impressed entirely across fluid blast interrupter 16, since vacuum interrupter 14 is initially closed. After a current zero occurs, the fluid blast interrupter may reignite in a smooth manner, since the vacuum interrupter remains closed and the fluid blast breaker contacts may not have separated to their maximum extent. However, after the fluid blast interrupter contacts have separated a distance sufficient to admit the arc-extinguishing fluid into the contact region and to preclude thermal reignition, the vacuum interrupter opens. The high rate of dielectric recovery of the vacuum interrupter after arcing now allows the fluid blast interrupter to recover its dielectric strength. When the fluid blast interrupter has recovered its dielectric strength sufficiently to substantially prevent further post-arc conductivity, the vacuum interrupter recovery voltage has, by about this time, risen to such a high level that the vacuum interrupter can no longer withstand the voltage appearing thereacross. As a result, the vacuum interrupter may alternately spark over and recover at high frequency. The high frequency current accompanying the repetitive sparkovers passes through the capacitance of the fluid blast interrupter and is of a relatively low magnitude.

The high frequency sparking occurs for only a limited time, being terminated by vacuum interrupter 14 closing while fluid blast interrupter 16 remains open. Vacuum interrupter 14, however, is closed only after sufficient time has elapsed to ensure that the interrupting operation has been completed by fluid blast interrupter 16. In the illustrated embodiment, the vacuum interrupter closing command is delivered to operator 72 through a closing-control channel 80 including a time delay unit 82 and a switch 83 on actuating mechanism 71 of operator 72. Switch 83 closes when vacuum interrupter 14 reaches its fully-open position. Time delay unit 82 can be suitably preadjusted to impart whatever time delay is needed to effect reclosing of vacuum interrupter 14 in the required time. The time required for driver 86 to impact upon follower 87 in lost motion linkage 78, however, is subtracted from whatever total time delay is required to effect reclosing of vacuum interrupter 14, when setting the delay in time delay unit 82.

When vacuum interrupter 14 is thus closed, all the circuit breaker voltage is applied to fluid blast interrupter 16. Because the fluid blast interrupter has, by this time, reached its full high dielectric capability, it is normally able to withstand this full voltage without breakdown.

Figure 4:
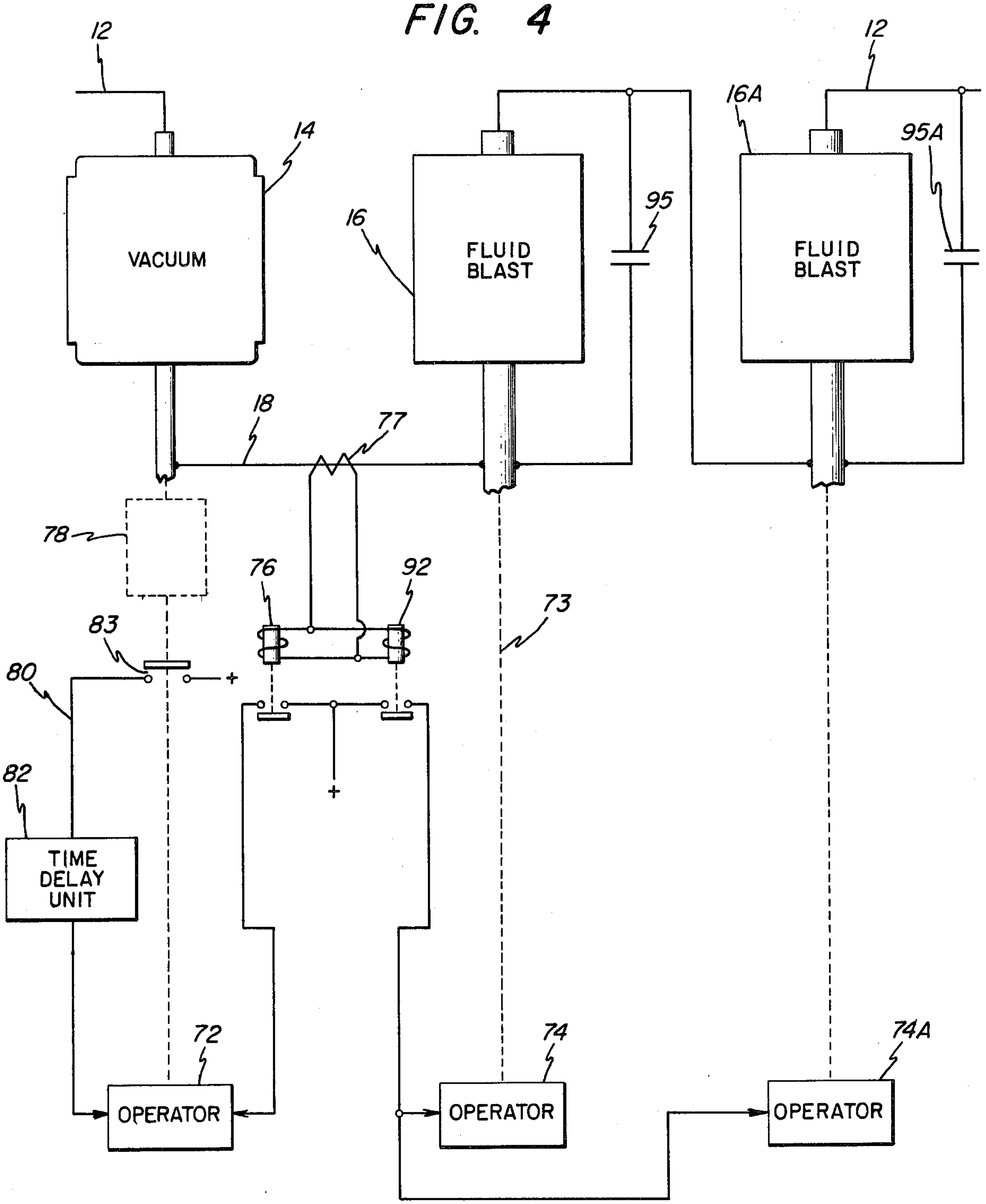
FIG. 4 is a schematic diagram of a third embodiment of the invention.

In higher voltage circuit breakers, it may be necessary to provide additional interrupters in series, as compared to the two interrupters of FIG. 1, in order to accommodate the higher voltages. This may be accomplished, as shown in FIG. 4 wherein like numerals correspond to like components described in conjunction with FIG. 1, by connecting two fluid blast interrupters 16 and 16A in series with a single vacuum interrupter 14, for example. In this instance, the fluid blast interrupters are arranged to be opened substantially simultaneously by energization of their respective operators 74 and 74A in parallel and, after a predetermined time interval following actuation of the fluid blast interrupters, the vacuum interrupter is actuated to an open condition in the manner described, supra. Voltage-dividing capacitors 95 and 95A may be connected across the individual fluid-blast interrupters 16 and 16A, respectively, but not the vacuum interrupter, as pointed out in the aforementioned Porter U.S. Pat. No. 3,982,088. The vacuum interrupter functions in the same manner as in the apparatus of FIG. 1; i.e., to impart a high rate of dielectric recovery to the circuit breaker during the initial period following arcing of the fluid blast interrupter. Thereafter, the circuit breaker voltage is divided between the fluid blast interrupters as determined by the size of the voltage-dividing capacitors connected thereacross.

The foregoing describes a circuit breaker employing a series-connected vacuum interrupter and fluid blast interrupter in which opening of the vacuum interrupter upon occurrence of a short-line or terminal fault is delayed for a predetermined time. The vacuum interrupter opens only upon occurrence of short-line or terminal faults, and the fluid blast interrupter reignites smoothly at low reignition voltage after occurrence of a short-line or terminal fault.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

I claim:

1. A high voltage alternating current circuit breaker comprising:
- a vacuum circuit interrupter including a first pair of separable contacts and a highly evacuated insulating housing enclosing said contacts;
- a fluid blast circuit interrupter including a second pair of separable contacts, means for separating said contacts of said second pair and means for producing a fluid blast between the contacts of said second pair when separated;
- means connecting the contacts of said vacuum interrupter and the contacts of said fluid blast interrupter electrically in series;
- means for separating the contacts of said vacuum circuit interrupter after a predetermined interval following opening of the contacts of said fluid blast circuit interrupter under fault conditions in which line current exceeds a predetermined amplitude level, said predetermined amplitude level being in excess of a minimum amplitude for opening the contacts of said fluid blast circuit interrupter,
- said fluid blast circuit interrupter exhibiting a slower dielectric recovery rate than said vacuum circuit interrupter during initial application of recovery voltage across the contacts of said interrupters immediately following arc extinction in the respective interrupter but also exhibiting an ability to withstand higher peak voltages than said vacuum circuit interrupter after said initial application of recovery voltage if no breakdown occurs during said initial period; and
- means for reclosing said vacuum circuit interrupter immediately after said fluid blast circuit interrupter has successfully withstood the recovery voltage applied thereacross and while said fluid blast circuit interrupter remains open.

2. The circuit breaker apparatus of claim 1 further including:
- a second fluid blast circuit interrupter electrically connected in series with the series-connected vacuum circuit interrupter and fluid blast circuit interrupter, said fluid blast interrupters arranged to be opened substantially simultaneously with each other; and
- a voltage-distributing capacitor respectively connected across each of said fluid blast circuit interrupters for distributing circuit breaker voltage between said fluid blast circuit interrupters, said second fluid blast circuit interrupter remaining open while said vacuum circuit interrupter is reclosed.

3. The circuit breaker apparatus of claim 1 wherein said means for separating the contacts of said vacuum circuit interrupter comprises an actuator rod for retracting one contact of said first pair of contacts, and a lost motion linkage including a driver connected to one end of said actuator rod and said one contact, and a follower connected to the other end of said actuator rod and said one contact.

4. The circuit breaker apparatus of claim 2 wherein said means for separating the contacts of said vacuum circuit interrupter comprises an actuator rod for retracting one contact of said first pair of contacts, and a lost motion linkage including a driver connected to one end of said actuator rod and said one contact, and a follower connected to the other end of said actuator rod and said one contact.

5. The circuit breaker apparatus of claim 1 wherein said means for separating the contacts of said vacuum circuit interrupter comprises:
- an actuating mechanism for separating the contacts of said first pair of contacts,
- operator means for driving said actuating mechanism; and
- current sensing means responsive to line current amplitude and coupled to said operator means for initiating movement of said actuating mechanism when sensed line current exceeds said predetermined amplitude level.

6. The circuit breaker apparatus of claim 5 further including:
- a second fluid blast circuit interrupter electrically connected in series with the series-connected vacuum circuit interrupter and fluid blast circuit interrupter, said fluid blast interrupters arranged to be opened substantially simultaneously with each other; and
- a voltage-distributing capacitor respectively connected across each of said fluid blast circuit interrupters for distributing circuit breaker voltage between said fluid blast circuit interrupters, said second fluid blast circuit interrupter remaining open while said vacuum circuit interrupter is reclosed.

7. The method of protecting electrical apparatus against short-line and terminal faults by employing a vacuum circuit interrupter and a fluid blast circuit interrupter in series with the line, said method comprising:
- continually sensing the electrical condition of said line;
- initiating opening of the fluid blast circuit interrupter immediately upon sensing a fault on said line; and
- initiating opening of said vacuum circuit interrupter after a first predetermined time interval following initiation of opening of said fluid blast circuit interrupter.

8. The method of protecting electrical apparatus against short-line and terminal faults of claim 7 including the step of reclosing said vacuum circuit interrupter after a second predetermined time interval following said first predetermined time interval, the total of said first and second intervals being less than the minimum time required for the fluid blast circuit interrupter to reclose after having opened.

* * * * *